United States Patent

Singh et al.

[15] 3,636,443

[45] Jan. 18, 1972

[54] METHOD OF TESTING DEVICES USING UNTESTED DEVICES AS A REFERENCE STANDARD

[72] Inventors: Shanker Singh, Beacon; Vijendrap P. Singh, Poughkeepsie, both of N.Y.

[73] Assignee: International Business Machines Corporation, Armonk, N.Y.

[22] Filed: Oct. 29, 1970

[21] Appl. No.: 85,007

[52] U.S. Cl. ...................................................324/73 R
[51] Int. Cl. ......................................................G01r 15/12
[58] Field of Search....................................................324/73

[56] References Cited

UNITED STATES PATENTS 3,526,836  9/1970  Deger et al. .......................324/73 R X

OTHER PUBLICATIONS

Phillon et al., Instrumentation Technology, Nov. 1967, page 67

Giedd et al. IBM Tech. Disc. Bull., Vol. 13, No. 5, Oct., 1970

*Primary Examiner*—Alfred E. Smith
*Attorney*—Hanifin & Jancin and Martin G. Reiffin

[57] ABSTRACT

A method of testing circuit chips using untested chips as a standard. A portion of the untested chips is selected at random and used as a reference standard. A random pulse generator generates patterns of pulses which are applied to the test standard chips and also successively to each of the remaining chips. A majority logic gate is employed to determine the majority outputs of the test standard chips. Each majority output is compared with the respective outputs of the remaining chips to determine which of the latter are qualified. Some of the qualified chips are then substituted for the test standard chips and the cycle is then repeated with the qualified chips, and repeated again with the twice-qualified chips. With each successive cycle the probability of qualifying good chips converges toward unity.

13 Claims, 4 Drawing Figures

INVENTORS
SHANKER SINGH
VIJENDRA P. SINGH

ATTORNEY

METHOD OF TESTING DEVICES USING UNTESTED DEVICES AS A REFERENCE STANDARD

BACKGROUND OF THE INVENTION

The testing of circuit chips has become more difficult and time consuming as the circuit density of integrated circuit chips has been increased. This is particularly true in the case of large-scale integration where a single chip may have about 100 or more circuit and wherein most of the internal circuit nodes are not connected to input or output pins and are not readily accessible.

Further difficulties arise from the need for a reliable reference chip to be used as a basis of comparison. In the prior art the test results were no more reliable than the reference chip. Fabrication and testing of the reference chip were difficult and expensive.

SUMMARY OF THE INVENTION

In the present invention the reference standard is readily constructed with initially untested or partially tested chips. Each output signal of these reference chips is passed to a majority gate. The output of the latter is then compared with the outputs of the chips being tested. Those chips passing this comparison test are qualified, and the process is then repeated utilizing only the qualified chips. With each iteration the probability of identifying good chips converges toward unity.

It is therefore a primary object of the present invention to provide a method of testing chips or other components wherein the need for a reliable reference standard is obviated.

A further object is to provide a testing method wherein the reference standard is formed of untested or partially tested chips.

Still another object is to provide a component testing method which is relatively fast, economical and reliable.

Other objects and advantages are either inherent in the method disclosed or will be apparent to those skilled in the art as the detailed description proceeds.

DESCRIPTION OF THE PREFERRED EMBODIMENT

Figure 1:
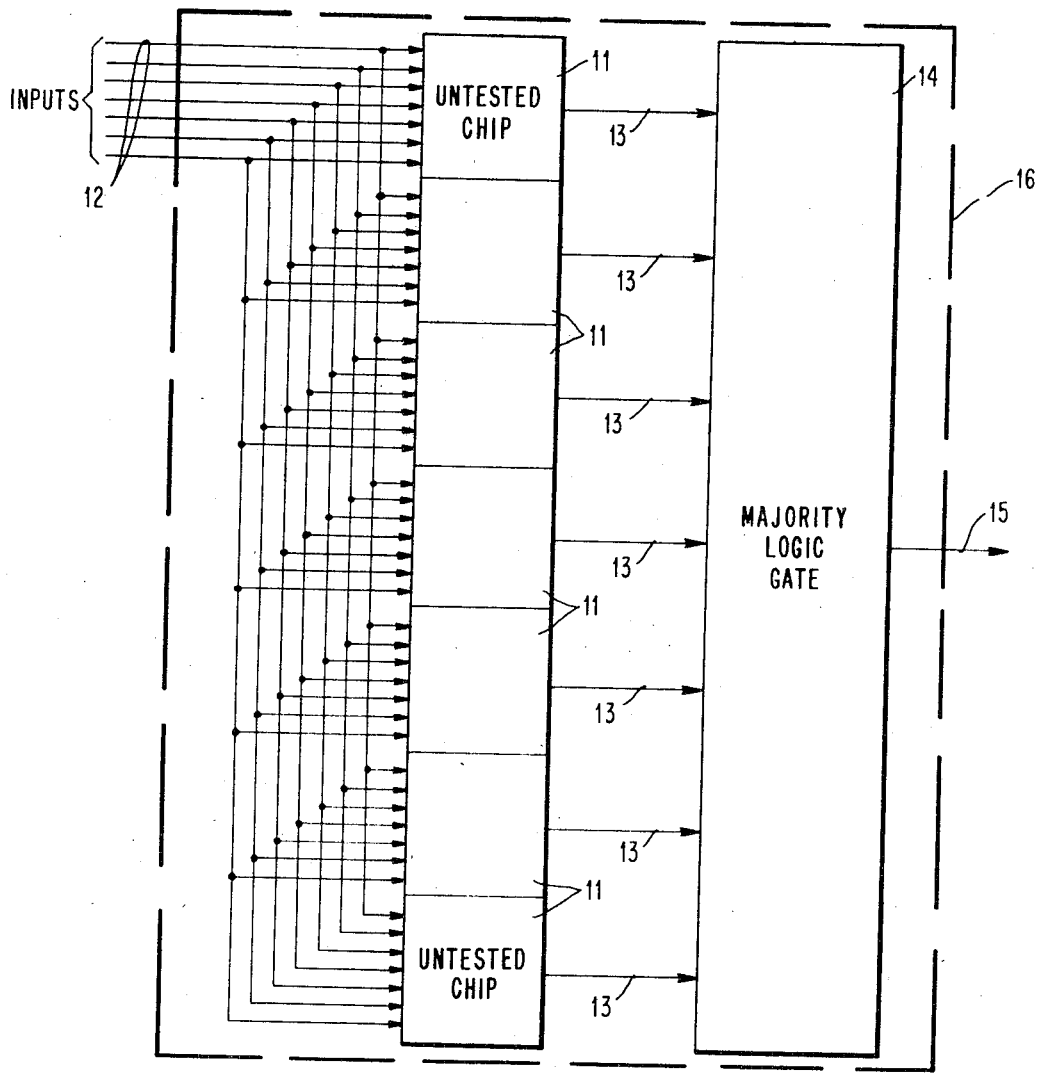
FIG. 1 is a schematic diagram showing how the reference standard is formed with untested or partially tested chips and a majority logic gate.
Figure 2:
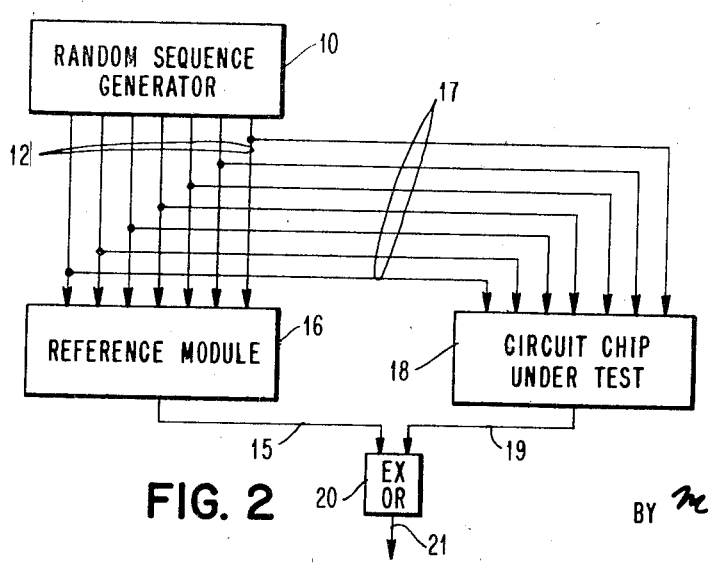
FIG. 2 is a schematic diagram showing apparatus for practicing the method of the present invention.

Referring now to the drawings in more detail, and first to FIG. 1 thereof, there is shown an arrangement for forming a test standard or reference module, indicated generally at 16, with a plurality of untested circuit chips 11. Input lines 12 transmit to each of the untested chips 11 a plurality of input signals derived from a random sequence generator 10 (FIG. 2). Each of the untested chips 11 is provided with an output line 13 leading to a majority logic gate 14 having an output lead 15. The majority logic gate 14 generates at output lead 15 a signal corresponding to the majority of the signals at the output leads 13 of the circuit chips 11.

As shown in FIG. 2, the signals on input leads 12 are also fed by leads 17 to each of the circuit chips 18 under test. For example, if there are 100 chips altogether and seven chips 11 are selected at random to form the reference module, then there will be left 93 chips 18 to be placed under test by comparison with the reference module. The output lead 19 of each circuit chip 18 is fed along with the output 15 of reference module 16 to an Exclusive-OR circuit 20 which acts as a comparator to determine whether the signals at output leads 15 and 19 are the same. The decision made by the Exclusive-OR circuit 20 is derived at its output 21. If the circuit chip 18 provides the same output signal at 19 as the reference module 16 does at 15, the Exclusive-OR circuit 20 will classify the circuit chip 18 as qualified.

Figure 3A:
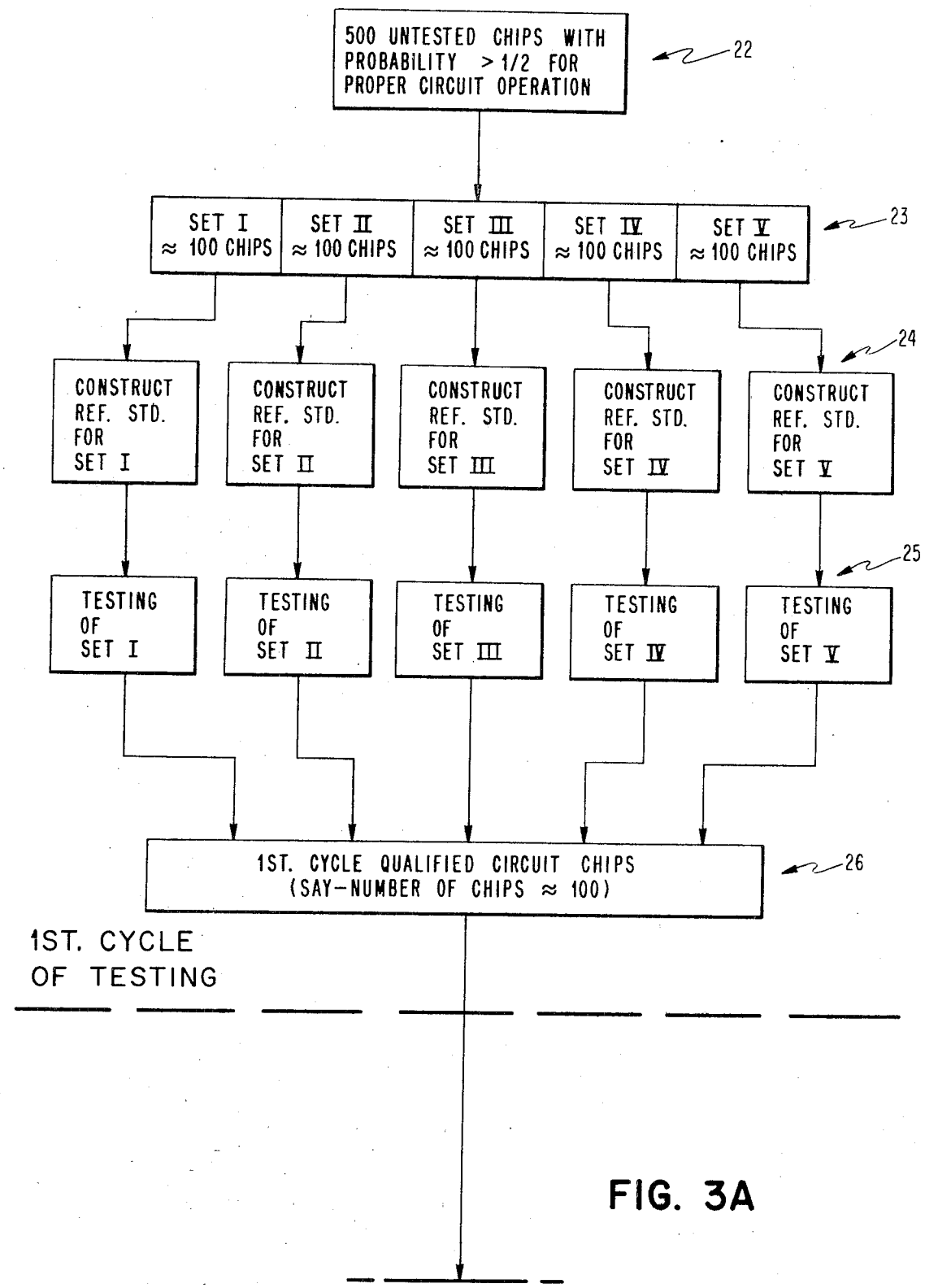
FIGS. 3A and 3B constitute a flow diagram showing the sequence of steps of the method of the present invention.
Figure 3B:
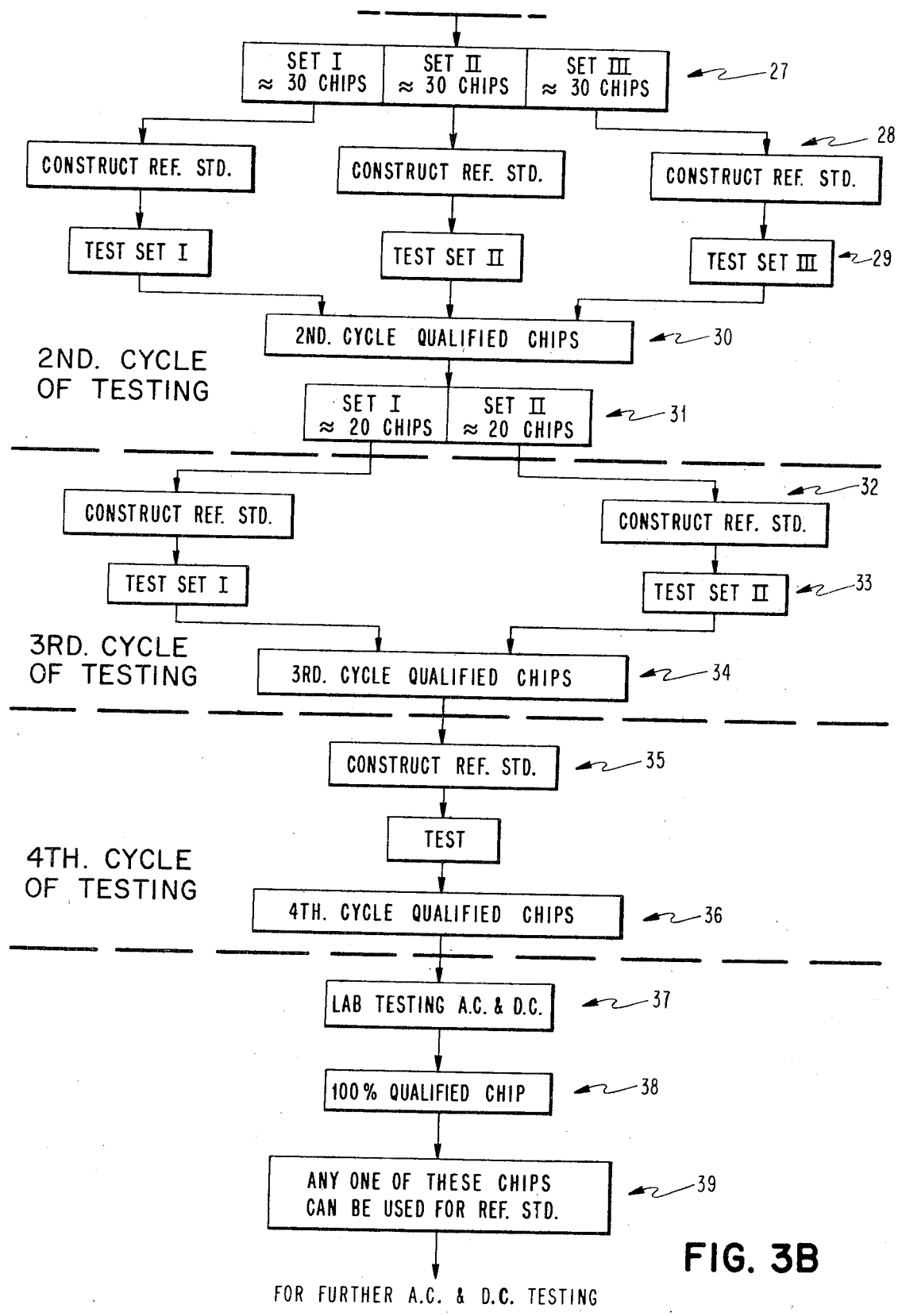

Referring now to FIGS. 3A and 3B there is shown a flow diagram depicting the iterations involved in the testing procedure. For example, the procedure may begin at 22 with a number of 500 untested chips. It is necessary that there is a probability greater than 0.5 that each chip gives the correct output for its various combinations of inputs. The 500 untested chips are then divided at 23 into five approximately equal sets of about 100 chips apiece. For each set there is constructed at 24 a reference standard and comprising a subset of chips 11 and a majority logic gate 14 as shown in FIG. 1. The remaining chips of each set are then tested at 25 by comparison with the reference module in the manner shown in FIG. 2 to derive at 26 a number of qualified circuit chips which passed the test.

The first cycle of testing is now complete and the second iteration begins at 27 by dividing the qualified circuit chips of the first cycle into, for example, three sets of about 30 chips apiece. Three reference standards are then constructed at 28 by selecting some of the qualified chips from each of the sets at 27. Utilizing the reference standards the remaining qualified chips are tested against the standards at 29 to provide at 30 the qualified chips resulting from the second iteration. These qualified chips are then divided into two sets at 31 and the same sequence is then repeated for the third iteration at 32 and 33 to provide at 34 the chips qualified at the end of the third cycle. The testing and qualifying of chips may be repeated for a fourth cycle of testing as shown at 35, 36. With each successive cycle or iteration the probability of qualified chips being good converges toward unity.

The resulting qualified chips at the end of the fourth cycle may then be tested by conventional laboratory techniques at 37 to identify a 100 percent qualified chip at 38. This chip may then be used at 39 as a reference standard for AC, DC or transient testing in the conventional manner.

It is to be understood that the specific embodiment of the invention disclosed herein is merely illustrative of one of the many forms which the invention may take in practice without departing from the scope of the invention as delineated in the appended claims, and that the latter are to be construed as broadly as permitted by the prior art.

We claim:

1. A method of testing a number of components and comprising the steps of selecting from said number a set of components to be used as a test standard, applying a pattern of pulses to said test standard and successively to each of the remaining components of said number, determining the output signals representative of the majority of the responses of said test standard, comparing the majority responses of the test standard components with the responses of the remaining components, identifying as qualified those remaining components having responses matching the majority responses, and repeating said selecting, applying, determining, comparing and identifying steps with said qualified components.

2. A method of testing components as recited in claim 1 wherein said pattern of pulses is random.

3. A method of testing components as recited in claim 1 and comprising a plurality of repeated iterations of said selecting, applying, determining, comparing and identifying steps, each iteration utilizing the chips qualified in the preceding iteration.

4. A method as recited in claim 1 and having a plurality of iterations each including said selecting, applying, determining, comparing and identifying steps applied to the respective qualified components of each prior iteration, said pattern of pulses being randomly generated.

5. A method of testing a number of circuit chips and comparing the steps of dividing the number of circuit chips into a plurality of sets, selecting from each set a subset of circuit chips to be used as a test standard, applying patterns of pulses to said test standard circuit chips and also successively to each of the remaining circuit chips of each respective set, determining the output signals representative of the majority of the responses of said test standard circuit chips, comparing the remaining circuit chip responses with said majority responses, identifying as qualified those remaining circuit chips having responses matching said majority responses, collecting those qualified circuit chips having responses matching said respective majority responses, and repeating all of the above steps with the remaining qualified circuit chips.

6. A method of testing components as recited in claim 5 wherein said patterns of pulses are random.

7. A method as recited in claim 6 having a plurality of iterations each including said dividing, selecting, applying, determining, comparing and identifying steps applied to the respective qualified circuits of each prior iteration.

8. A method of testing circuits using untested circuits as a reference standard, said method comprising the steps of dividing the untested circuits into a plurality of sets, selecting for each set a subset of circuits for use as a reference standard, applying a sequence of signals to each circuit of each subset, determining the response to said signal of the majority of said circuits of each subset, applying said sequence of signals to each of the other circuits of each set, comparing each of said majority responses respectively to each response of said other circuits of each set, classifying as qualified those circuits of the set which have the same response as the majority response of the respective reference standard circuits, and repeating said dividing, selecting, applying, determining, comparing and classifying steps utilizing only said qualified circuits of each set.

9. A method of testing components as recited in claim 8 wherein said patterns of pulses are random.

10. A method as recited in claim 9 having a plurality of iterations each including said dividing, selecting, applying determining, comparing and classifying applied to the respective qualified circuits of each prior iteration.

11. A method of testing a set of components and comprising the steps of selecting from said set a subset of components to be used as a test standard, applying a pattern of pulses to said test standard and successively to each of the remaining components of said set, determining the output signals representative of the majority of the responses of said test standard, comparing the majority of responses of the test standard components with the responses of the remaining components, and identifying as qualified those remaining components having responses matching the majority responses.

12. A method of testing components as recited in claim 11 wherein said patterns of pulses are random.

13. A method as recited in claim 12 having a plurality of iterations each including said selecting, applying, determining, comparing and identifying steps applied to the respective qualified circuits of each prior iteration.

* * * * *

UNITED STATES PATENT OFFICE
CERTIFICATE OF CORRECTION

Patent No. 3,636,443　　　　　　　　　Dated January 18, 1972

Inventor(s) Shanker Singh and Vijendrap P. Singh

It is certified that error appears in the above-identified patent and that said Letters Patent are hereby corrected as shown below:

Column 2, Lines 71-72　　　　　　change "comparing" to
Claim 5　　　　　　　　　　　　　--comprising--
(In the Claims, Claim 5
Lines 1-2)

Signed and sealed this 6th day of February 1973.

(SEAL)
Attest:

EDWARD M. FLETCHER, JR.　　　　　　　　　　ROBERT GOTTSCHALK
Attesting Officer　　　　　　　　　　　　　Commissioner of Patents